US012374479B2

(12) United States Patent
Dolezalek et al.

(10) Patent No.: US 12,374,479 B2
(45) Date of Patent: Jul. 29, 2025

(54) MAGNETIC MOUNT ASSEMBLY

(71) Applicant: Banner Engineering Corp., Minneapolis, MN (US)

(72) Inventors: Charles Dolezalek, Blaine, MN (US); Matthew Espindola Munn, St. Michael, MN (US); Robert Schlosser, Eden Prairie, MN (US)

(73) Assignee: Banner Engineering Corp., Minneapolis, MN (US)

( * ) Notice: Subject to any disclaimer, the term of this patent is extended or adjusted under 35 U.S.C. 154(b) by 178 days.

(21) Appl. No.: 18/109,653

(22) Filed: Feb. 14, 2023

(65) Prior Publication Data

US 2024/0274339 A1 Aug. 15, 2024

(51) Int. Cl.
*H01F 7/02* (2006.01)
*H01F 41/02* (2006.01)

(52) U.S. Cl.
CPC ....... *H01F 7/0221* (2013.01); *H01F 41/0253* (2013.01)

(58) Field of Classification Search
CPC ........................... H01F 7/0221; H01F 41/0253
USPC ........................................................ 335/296
See application file for complete search history.

(56) References Cited

U.S. PATENT DOCUMENTS 5,959,520 A * 9/1999 Stelter ................... H01F 7/0278 335/306
6,412,350 B1 * 7/2002 Swift ...................... G01L 5/226 73/779
6,598,479 B1 7/2003 Robinson et al.
6,892,581 B2 5/2005 Robinson et al.
7,961,069 B2 * 6/2011 Fullerton .................. G09F 7/04 24/303
10,732,150 B2 8/2020 Flanagan
10,787,323 B2 9/2020 Mair
2005/0068140 A1 * 3/2005 Huang ................. G01R 33/383 324/318
2006/0139134 A1 * 6/2006 Hunts ................... H01F 7/0242 335/205
2006/0174713 A1 * 8/2006 Lin ....................... G01L 5/0076 73/779
2009/0251255 A1 * 10/2009 Fullerton .............. H01F 7/0284 335/296
2009/0251256 A1 * 10/2009 Fullerton .............. H01F 7/0284 335/296
2009/0295521 A1 * 12/2009 Fullerton ............... G01D 18/00 335/306
2011/0050373 A1 * 3/2011 LaFountain ........... H01F 7/0284 335/205

(Continued)

*Primary Examiner* — Shawki S Ismail
*Assistant Examiner* — Lisa N Homza
(74) *Attorney, Agent, or Firm* — Mueting Raasch Group

(57) ABSTRACT

The technology disclosed herein relates to a magnetic mounting assembly having a frame. A first ferromagnetic extension is fixed to the frame and extends in an axial direction. A second ferromagnetic extension is fixed to the frame and extends in the axial direction. A bar magnet has a first lateral end defining a first magnetic pole magnetically coupled to the first ferromagnetic extension. The bar magnet has a second lateral end defining an opposite magnetic pole magnetically coupled to the second ferromagnetic extension. The first ferromagnetic extension and the second ferromagnetic extension are configured to fix the bar magnet relative to the frame.

12 Claims, 3 Drawing Sheets

(56) References Cited

U.S. PATENT DOCUMENTS

| | | | | |
|---|---|---|---|---|
| 2012/0306604 | A1* | 12/2012 | Fullerton | H01F 7/0242 335/306 |
| 2013/0111710 | A1* | 5/2013 | Hunts | H01F 7/0242 24/303 |
| 2013/0113584 | A1* | 5/2013 | Hunts | H01F 7/0242 335/285 |
| 2019/0178689 | A1 | 7/2019 | DeCook | |
| 2020/0122633 | A1* | 4/2020 | Hammock | B60Q 1/0094 |

* cited by examiner

MAGNETIC MOUNT ASSEMBLY

TECHNOLOGICAL FIELD

The present disclosure is generally related to a mount assembly. More particularly, the present disclosure is related to a magnetic mount assembly.

BACKGROUND

Various types of devices have mounting assemblies that facilitate mounting the device to a structure. Mounting assemblies can have a wide variety of configurations having functional features that enable securing a device to a structure. Magnet mounting assemblies can be desirable in a variety of implementations where one or both of the device and the structure upon which the device is mounted is constructed of a ferrous material. Magnet mounting assemblies can be desirable due to the ease of mounting, as well as the ease of repositioning or altogether removing the mounting assembly.

SUMMARY

Some embodiments of the technology disclosed herein relate to a magnetic mounting assembly having a frame. A first ferromagnetic extension is fixed to the frame. The first ferromagnetic extension extends in an axial direction. A second ferromagnetic extension is fixed to the frame. The second ferromagnetic extension extends in the axial direction. A bar magnet has a first lateral end defining a first magnetic pole magnetically coupled to the first ferromagnetic extension. The bar magnet has a second lateral end defining an opposite magnetic pole magnetically coupled to the second ferromagnetic extension. The first ferromagnetic extension and the second ferromagnetic extension are configured to fix the bar magnet relative to the frame.

In some such embodiments the frame defines a connector structure that is configured to be coupled to a sensing device. Additionally or alternatively, the frame is a component of a sensing device. Additionally or alternatively, the assembly lacks adhesive between the bar magnet and the frame. Additionally or alternatively, the frame is constructed of a non-magnetic material. Additionally or alternatively, the frame is constructed of one or more materials in a group consisting of: aluminum, plastic, and zinc. Additionally or alternatively, the frame has a lateral end wall and a sidewall extending axially from the lateral end wall. Additionally or alternatively, the lateral end wall and the sidewall define a cavity within which the bar magnet, the first ferromagnetic extension, and the second ferromagnetic extension are disposed. Additionally or alternatively, the magnetic mounting assembly has a first fastener that fixes the frame to the first ferromagnetic extension. Additionally or alternatively, the magnetic mounting assembly has a second fastener that fixes the frame to the second ferromagnetic extension. Additionally or alternatively, the first ferromagnetic extension has a first proximal end disposed in the cavity and a first distal end outside of the cavity. Additionally or alternatively, the second ferromagnetic extension has a second proximal end disposed in the cavity and a second distal end outside of the cavity. Additionally or alternatively, the first distal end and the second distal end define a plane.

Additionally or alternatively, the first ferromagnetic extension and the second ferromagnetic extension each define a retaining surface that retains the position of the bar magnet relative to the frame. Additionally or alternatively, the first ferromagnetic extension defines a first angled connection surface extending from the first distal end at an acute angle relative to the plane. Additionally or alternatively, the second ferromagnetic extension defines a second angled connection surface extending from the second distal end at an acute angle relative to the plane. Additionally or alternatively, the frame defines a lateral end wall. Additionally or alternatively, the first ferromagnetic extension has a first retaining surface facing the lateral end wall. Additionally or alternatively, the second ferromagnetic extension has a second retaining surface facing the lateral end wall. Additionally or alternatively, the bar magnet is retained between the lateral end wall on a proximal end of the bar magnet and the first and second retaining surfaces on a distal end of the bar magnet.

Some embodiments of the technology disclosed herein relate to a method of assembling a magnetic mounting assembly. A proximal end of a bar magnet is positioned on a frame. The bar magnet has a first lateral end defining a first magnetic pole and a second lateral end defining an opposite magnetic pole. A first ferromagnetic extension is magnetically coupled to the first lateral end of the bar magnet. The first ferromagnetic extension extends in an axial direction. The first ferromagnetic extension is fastened to the frame. A second ferromagnetic extension is magnetically coupled to the second lateral end of the bar magnet. The second ferromagnetic extension extends in the axial direction. The second ferromagnetic extension is fastened to the frame. The bar magnet is fixed relative to the frame as a result of fastening the first ferromagnetic extension and the second ferromagnetic extension to the frame.

In some such embodiments the frame defines a connector structure that is configured to be coupled to a sensing device. Additionally or alternatively, the frame is a component of a sensing device. Additionally or alternatively, the assembly lacks adhesive between the bar magnet and the frame. Additionally or alternatively, the frame is constructed of a non-magnetic material. Additionally or alternatively, the frame is constructed of one or more materials in the group consisting of: aluminum, plastic, and zinc. Additionally or alternatively, the frame has a lateral end wall and a sidewall extending axially from the lateral end wall. Additionally or alternatively, the lateral end wall and the sidewall define a cavity. Additionally or alternatively, the bar magnet, the first ferromagnetic extension, and the second ferromagnetic extension are disposed in the cavity. Additionally or alternatively, the first ferromagnetic extension is fastened to the frame. Additionally or alternatively, the first ferromagnetic extension is fastened to the frame by fastening a first fastener to the frame and the first ferromagnetic extension. Additionally or alternatively, the second ferromagnetic extension is fastened to the frame by fastening a second fastener to the frame and the second ferromagnetic extension. Additionally or alternatively, the first ferromagnetic extension is disposed in the cavity. Additionally or alternatively, a first proximal end of the first ferromagnetic extension is disposed in the cavity while a first distal end of the first ferromagnetic extension remains outside of the cavity. Additionally or alternatively, the second ferromagnetic extension is disposed in the cavity. Additionally or alternatively, a second proximal end of the second ferromagnetic extension is disposed in the cavity while a second distal end of the second ferromagnetic extension remains outside of the cavity.

Additionally or alternatively, the first distal end and the second distal end define a plane. Additionally or alternatively, the first ferromagnetic extension defines a first angled connection surface extending from the first distal end at an acute angle relative to the plane. Additionally or alternatively, the second ferromagnetic extension defines a second angled connection surface extending from the second distal end at an acute angle relative to the plane. Additionally or alternatively, a first distal end of the first ferromagnetic extension and a second distal end of the second ferromagnetic extension each define a retaining surface that retains the position of the bar magnet relative to the frame. Additionally or alternatively, each retaining surface is configured to abut a distal end of the bar magnet that is opposite the proximal end of the bar magnet. Additionally or alternatively, the frame defines a lateral end wall. Additionally or alternatively, the first ferromagnetic extension has a first retaining surface facing the lateral end wall. Additionally or alternatively, the second ferromagnetic extension has a second retaining surface facing the lateral end wall. Additionally or alternatively, the bar magnet is retained between the lateral end wall on the proximal end of the bar magnet and the first retaining surface and the second retaining surface on a distal end of the bar magnet. Additionally or alternatively, positioning the proximal end of the bar magnet on the frame occurs after (a) magnetically coupling the first ferromagnetic extension to the first lateral end of the bar magnet and (b) magnetically coupling the second ferromagnetic extension to the second lateral end of the bar magnet.

The above summary is not intended to describe each embodiment or every implementation. Rather, a more complete understanding of illustrative embodiments will become apparent and appreciated by reference to the following Detailed Description of Exemplary Aspects and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
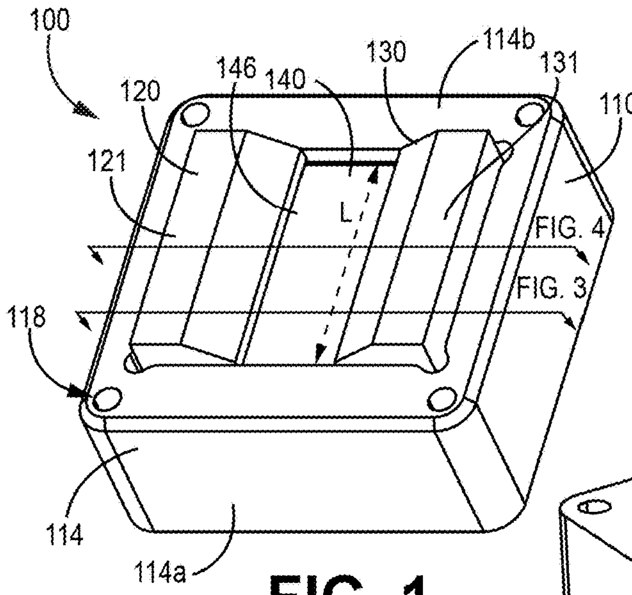
FIG. 1 is a first perspective view of an example assembly consistent with the technology disclosed herein.
Figure 2:
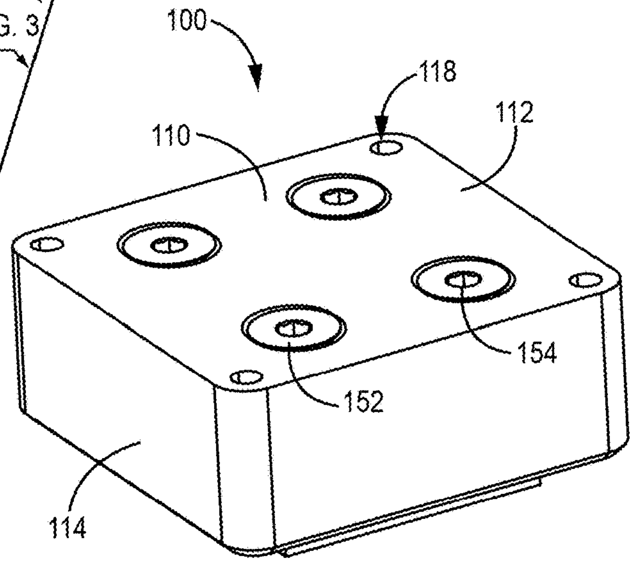
FIG. 2 is a second perspective view of the example assembly of FIG. 1.
Figure 3:
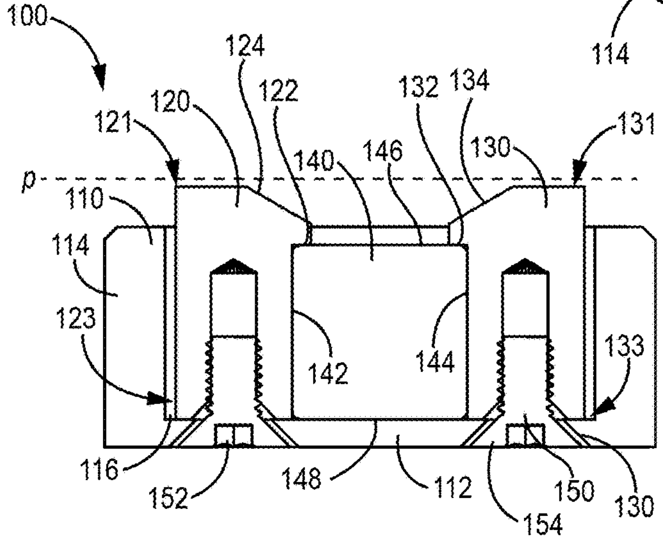
FIG. 3 is a cross-sectional view of the assembly of FIG. 1 through a first cross section.
Figure 4:
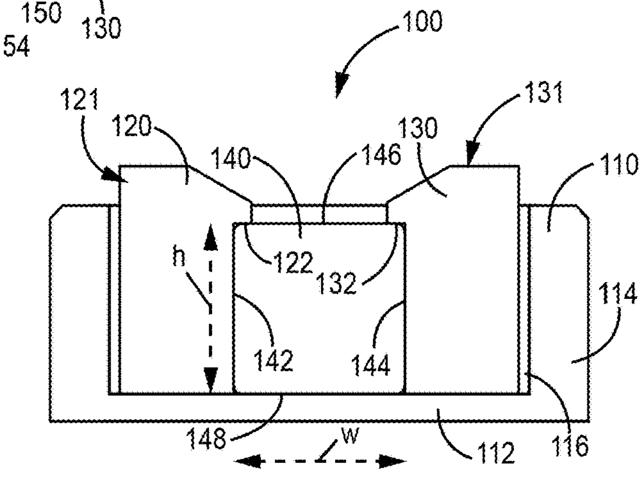
FIG. 4 is a cross-sectional view of the assembly of FIG. 1 through a second cross section.

FIGS. 1-4 are consistent with one example of a magnetic mounting assembly 100 consistent with the technology disclosed herein. FIG. 1 is a first perspective view of the magnet mounting assembly 100 and FIG. 2 is a second perspective view of the magnetic mounting assembly 100. FIG. 3 is a first cross-sectional view of the magnetic mounting assembly 100 and FIG. 4 is a second cross-sectional view of the magnetic mounting assembly 100, where each of the cross-sectional views are represented in FIG. 1. The magnetic mounting assembly 100 is generally configured to allow mounting of a device coupled thereto to a ferromagnetic structure. The magnetic mounting assembly 100 generally has a frame 110, a first ferromagnetic extension 120, a second ferromagnetic extension 130, and a bar magnet 140.

The frame 110 is generally configured to structurally support the other components of the mounting assembly 100. In some embodiments, the frame 110 is configured to at least partially house one or more components or devices. In some such embodiments, such as that depicted, the frame 110 is configured to at least partially house other components of the assembly 100, such as the bar magnet 140, the first ferromagnetic extension 120, and the second ferromagnetic extension 130. In some other embodiments the frame 110 does not house the other components of the assembly 100.

The frame 110 generally has a lateral end wall 112 that is visible in FIGS. 2-4. In the current example, the frame 110 has a sidewall 114 extending axially from the lateral end wall 112. In the current example, the lateral end wall 112 and the sidewall 114 define a cavity 116 (FIGS. 3-4). While the example sidewall 114 currently has four segments that are joined at corners around the cavity 116, in some other examples, the sidewall 114 can be a single segment that extends around the cavity 116, such as where the sidewall 114 has a tubular shape. It will be appreciated that the sidewall can have other configurations as well. In some embodiments, the sidewall 114 can be omitted.

In various embodiments, the frame 110 is configured to be coupled to a component that is to be magnetically mounted to a structure via the mounting assembly 100. In the current example, the frame 110 defines a connector structure 118 that is configured to be coupled to the component. In this example, the connector structure 118 includes a plurality of fastener openings that are configured to receive fasteners. The fastener openings extend axially through the lateral end wall 112 and the sidewall 114. In embodiments that omit a sidewall 114, the fastener openings can extend through the lateral end wall 112 only. Fasteners are configured to engage the frame 110, via the fastener openings, and the component to couple the frame to the component. Fasteners can include screws, rivets, bolts, and the like. Other types of connector structures 118 can also be used. For example, in some embodiments the connector structure can be a clamp or adhesive. The connector structure 118 can be configured to directly receive the component. For example, the connector structure 118 is a bayonet connector that is configured to couple to a mating bayonet connector defined by the component to be mounted. As another example, the connector structure 118 and the component to be mounted define an interference fit such as dovetail joint.

The connector structure 118 can be configured to couple to any type of component and/or device. In some example implementations, the connector structure 118 is configured to be coupled to an electromechanical device or electrical device such as a light, speaker, camera, emitter, and the like. In one example implementation, the connector structure 118 is configured to be coupled to a sensing device. The sensing device can be any type of device, and in one example the sensing device is a vibrational sensor, temperature sensor, impedance sensor, capacitive sensors, optical sensors, and the like, and combinations thereof. It is noted that, in some other embodiments that will be explained further herein, the frame 110 can be a component of a sensing device rather than being coupled to a sensing device.

The frame 110 can be constructed of a variety of types of materials and combinations of materials. In some examples, the frame 110 is constructed of a non-magnetic material. In some examples, the frame 110 is constructed of a weakly magnetic material. While in some examples the frame 100 is constructed of a non-ferrous material, in other examples the frame 110 can be constructed of a ferrous material. The frame 110 can be constructed of materials such as aluminum, stainless steel, plastic, zinc, and combinations thereof. The frame 110 can be constructed through a variety of different approaches and combinations of approaches including molding, machining, 3D printing, assembling, and the like.

The bar magnet 140 is generally configured to produce a magnetic field that allows for magnetic mounting of the assembly 100 (and a component coupled thereto) to a ferromagnetic structure. The bar magnet 140 is generally "fixed" relative to the frame 110, which is used herein to encompass shifts in the position of the bar magnet 140 relative to the frame 110 within manufacturing tolerances between the bar magnet 140 and adjacent components such as the first ferromagnetic extension 120, the second ferromagnetic extension 130, and the frame 110. In the current example, the bar magnet 140 is disposed in the cavity 116 defined by the frame 110.

The bar magnet 140 has a first lateral end 142 defining a first magnetic pole and a second lateral end 144 defining an opposite magnetic pole (visible in FIGS. 3 and 4). The distance between the first lateral end 142 and the second lateral end 144 is referred to as the width w of the bar magnet 140. Further, the bar magnet 140 has a proximal end 148, which can be referred to as a "proximal end surface" in embodiments where the proximal end 148 forms a surface, and a distal end 146, which can be referred to as a "distal end surface" in embodiments where the distal end 146 forms a surface. The distance between the proximal end 148 and the distal end 146 can be is referred to as the height h (FIG. 4) of the bar magnet 140. The proximal end 148 is positioned adjacently to, and in some embodiments abutting, the lateral end wall 112 of the frame 110. In the current example, the bar magnet 140 has a cuboid structure. The bar magnet 140 can be constructed of a wide variety of materials and combinations of materials, although such materials will generally be a permanent magnetic. In some embodiments the bar magnet 140 is at least partially constructed of neodymium, although other materials are also contemplated. In some embodiments the bar magnet 140 is at least partially constructed of samarium cobalt.

The first ferromagnetic extension 120 and the second ferromagnetic extension 130 are generally configured to transmit magnetic force from the bar magnet 140. The first ferromagnetic extension 120 is magnetically coupled to the first magnetic pole defined by the first lateral end 142 of the bar magnet 140. The second ferromagnetic extension 130 is magnetically coupled to the second magnetic pole defined by the second lateral end 144 of the bar magnet 140. The first ferromagnetic extension 120 has a first distal end 121 that becomes magnetized via the first magnetic pole of the bar magnet 140 and the second ferromagnetic extension has a second distal end 131 that becomes magnetized via the second magnetic pole of the bar magnet 140. In the current example, the first distal end 121 and the second distal end 131 define a plane p. The plane p can define a surface that can be magnetically coupled to a ferromagnetic structure for mounting the mounting assembly 100. It is noted that the bar magnet 140, the first ferromagnetic extension 120, and the second ferromagnetic extension 130 cumulatively approximate the shape of a "horseshoe" magnet, which may advantageously increase the magnetic force of the assembly 100 relative to a non-horseshoe configuration.

In some embodiments, the first ferromagnetic extension 120 and the second ferromagnetic extension 130 are configured to mount to both structures defining a planar surface as well as surfaces that exhibit a curvature, such as cylindrical structures. The first ferromagnetic extension 120 can define a first angled connection surface 124 extending from the first distal end 121 at an acute angle relative to the plane p. The first angled connection surface 124 can extend axially inward and laterally inward from the first distal end 121. The second ferromagnetic extension 130 can define a second angled connection surface 134 extending from the second distal end 131 at an acute angle relative to the plane p. The second angled connection surface 134 can extend axially inward and laterally inward from the second distal end 131.

Configuring the first ferromagnetic extension 120 and a second ferromagnetic extension 130 to magnetically mount to a structure rather than directly mounting the bar magnet 140 to the structure may advantageously improve the useful life of the assembly 100. Materials that form permanent magnets such as the bar magnet 140 can be brittle, and so directly mounting the bar magnet 140 to the structure may result in forces that can degrade the structure of the bar magnet 140 over time. The first ferromagnetic extension 120 and the second ferromagnetic extension 130 can be constructed of materials that are less brittle than the bar magnet 140. As such, the bar magnet 140 is configured to mount to the structure indirectly through the first ferromagnetic extension 120 and the second ferromagnetic extension 130. In some embodiments the first ferromagnetic extension 120 and the second ferromagnetic extension 130 can be directly mounted to the structure, and in some embodiments an intervening material can be disposed on the distal end of each of the first ferromagnetic extension 120 and the second ferromagnetic extension 130 such as a coating that directly contacts the structure.

In various embodiments, the first ferromagnetic extension 120 and the second ferromagnetic extension 130 are configured to fix the bar magnet 140 relative to the frame 110. Such a configuration may advantageously eliminate the need to fix the bar magnet 140 directly to the frame 110 such as with fasteners or adhesives. Indeed, in some embodiments the assembly 100 lacks adhesive between the bar magnet and the frame, although in some other examples an adhesive can be disposed between the bar magnet 140 and the frame 110 as a supplement to the configuration of the first ferromagnetic extension 120 and the second ferromagnetic extension 130 that fixes the bar magnet 140 relative to the frame 110. Further, an adhesive or other material can be used between the bar magnet 140 and the frame and/or between the ferromagnetic extensions 120, 130 and the bar magnet 140 as a spacer structure to prevent direct contact between the bar magnet 140 and an adjacent component. In some other embodiments a gasket material can serve as a spacer structure between the bar magnet 140 and an adjacent component. Materials that form permanent magnets such as the bar magnet 140 can be brittle, and so directly fastening the bar magnet 140 to the frame 110 may create structural forces that can degrade the structure of the bar magnet 140 over time. Further, using an adhesive alone to directly couple the bar magnet 140 to the frame 110 may limit the useable life of the mounting assembly 100 due to adhesive degradation over time and/or in response to exposure to some temperatures or temperature changes.

To fix the bar magnet 140 relative to the frame 110, the first ferromagnetic extension 120 is fixed to the frame 110 and the second ferromagnetic extension 130 is fixed to the frame 110. As discussed above, the first ferromagnetic extension 120 is magnetically coupled to the first lateral end 142 of the bar magnet 140 and the second ferromagnetic extension 130 is magnetically coupled to the second lateral end 144 of the bar magnet 140. The bar magnet 140 is positioned in a first lateral direction between the first ferromagnetic extension 120 and the second ferromagnetic extension 130 which fixes the position of the bar magnet 140 in the first lateral direction. The first ferromagnetic extension 120 and the second ferromagnetic extension 130 each define a retaining surface (a first retaining surface 122 and a second retaining surface 132, respectively) that retains the position of the bar magnet 140 relative to the frame 110. The first retaining surface 122 is defined towards the first distal end 121 and the second retaining surface 132 is defined towards the second distal end 131.

Each retaining surface 122, 132 faces the lateral end wall 112 of the frame 110. Each retaining surface 122, 132 extends laterally inward (relative to the assembly 100) from another portion of the corresponding ferromagnetic extension 120, 130 across a portion of a distal end 146 of the bar magnet 140. In the current example, the bar magnet 140 is positioned in the axial direction between (1) the first retaining surface 122 and the lateral end wall 112 and (2) between the second retaining surface 132 and the lateral end wall 112, which retains the position of the bar magnet 140 in the axial direction. Furthermore, in the example shown, which is particularly visible in FIG. 1, the bar magnet 140 is positioned in a second lateral direction, orthogonal to the first lateral direction, between opposing sidewall segments 114*a*, 114*b* of the sidewall 114 of the frame 110, which fixes the position of the bar magnet 140 in the second lateral direction relative to the frame 110. However, other configurations can also be used. It is noted that the extent of the bar magnet 140 in the second lateral direction is referred to as the length L.

In various embodiments consistent with the current example, the first ferromagnetic extension 120, the second ferromagnetic extension 130, and the frame 110 are configured to fix the position of the bar magnet 140 relative to the assembly 100. In particular, the first ferromagnetic extension 120, the second ferromagnetic extension 130, and the frame 110 are configured to fix the position of the bar magnet 140 by obstructing translation of the bar magnet 140 in three dimensions. The first ferromagnetic extension 120 and the second ferromagnetic extension 130 obstructs translation of the bar magnet 140 along the direction parallel to its width w. The first retaining surface 122 and the second retaining surface 132 and the lateral end wall 112 obstruct translation of the bar magnet 140 along the direction parallel to its height h beyond manufacturing tolerances in the axial direction between the first retaining surface 122 and the lateral end wall 112, and the second retaining surface 132 and the lateral end wall 112. The opposing sidewall segments 114*a*, 114*b* of the sidewall 114 obstructs translation of the bar magnet 140 along a direction parallel to its length L beyond manufacturing tolerances in the length L direction between the opposing sidewall segments 114*a*, 114*b*.

In the current example, a first proximal end 123 of the first ferromagnetic extension 120 is fixed to the lateral end wall 112 and a second proximal end 133 of the second ferromagnetic extension 130 is fixed to the lateral end wall 112 with fasteners 150 such as screws, rivets, bolts, or the like. In the current example, a first fastener 152 fixes the frame 110 to the first ferromagnetic extension 120 and a second fastener 154 fixes the frame 110 to the second ferromagnetic extension 130. Other connectors alternative to or in addition to fasteners can be used to fix each of the extensions to the frame 110 such as clamps, adhesives, and the like. Further, in some other embodiments, one or both of the first ferromagnetic extension 120 and the second ferromagnetic extension 130 is fixed to the sidewall 114 through one or more approaches discussed above.

In the current example, the first proximal end 123 of the first ferromagnetic extension 120 and the second proximal end 133 of the second ferromagnetic extension 130 are disposed in the cavity 116 of the frame 110. The first proximal end 123 and the second proximal end 133 of the first ferromagnetic extension 120 and the second ferromagnetic extension 130, respectively, each extend outward in the axial direction from the lateral end wall 112. In the current example, the distal ends 121, 131 of the first ferromagnetic extension and the second ferromagnetic extension 130 are outside of the cavity 116 of the frame 110 and define the distal-most end of the assembly 100 to prevent structural interference between (1) the first ferromagnetic extension 120 and the structure onto which the assembly 100 is mounted and (2) the second ferromagnetic extension 130 and the structure onto which the assembly 100 is mounted.

In some embodiments, it can be desirable to configure the bar magnet 140 to have a width w that is distinguishable from the length L and the height h. Such a configuration may advantageously increase manufacturing efficiencies of the assembly by allowing the magnetic poles 142, 144 of the bar magnet 140 to be relatively easily identifiable based on the width w of the bar magnet 140 relative to the length L and the height h. The width w of the bar magnet 140 generally defines the minimum lateral distance between the first ferromagnetic extension 120 and the second ferromagnetic extension 130. The height h of the bar magnet 140 generally defines the minimum axial distance between each retaining surface 122, 132 and the lateral end wall 112 of the frame 110. The length L of the bar magnet 140 generally defines the minimum axial distance between the two opposing sidewall segments 114*a*, 114*b* of the frame 110. In some embodiments, it can be desirable to configure the bar magnet 140 to have a length L, width w, and height h that are unequal. As a result, the proper orientation of the bar magnet 140 within the assembly 100 can be ascertained relatively quickly and easily, which may streamline assembling the assembly 100. In some embodiments the length L, width w, and height h are visually distinguishable, and in some embodiments the length L, width w and height h are distinguishable by manufacturing components such as a sensor.

Figure 5:
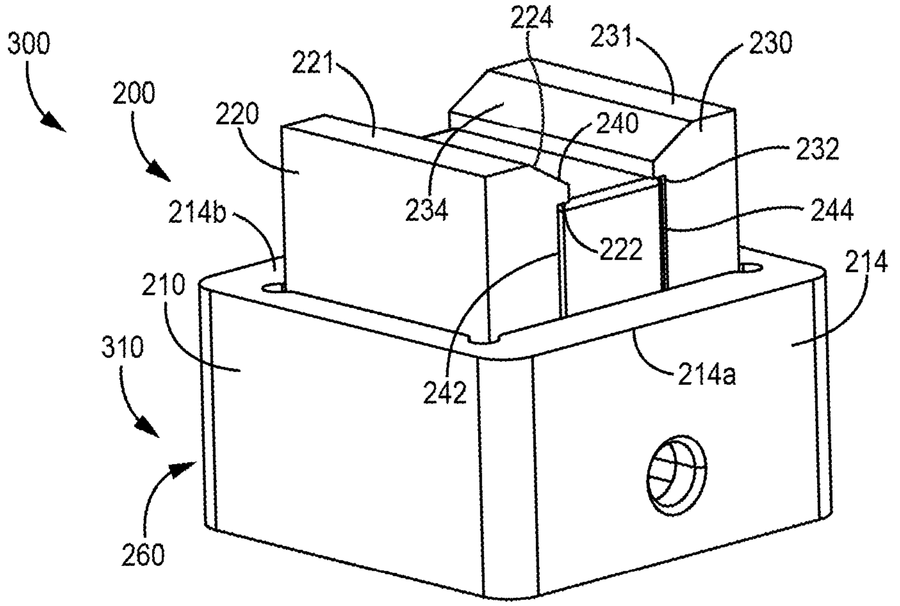
FIG. 5 is a partial perspective and cross-sectional view of another example assembly consistent with the technology disclosed herein.
Figure 6:
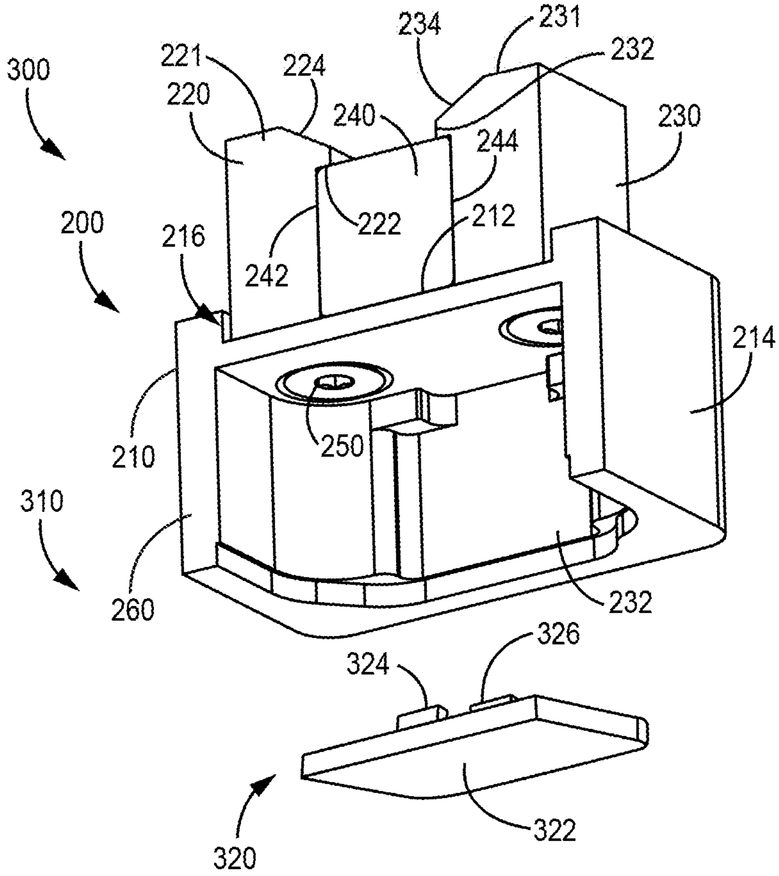
FIG. 6 is a partial perspective and cross-sectional view of yet another example assembly consistent with the technology disclosed herein.

FIG. 5 is a perspective view of another example magnetic mounting assembly 200 consistent with embodiments, and FIG. 6 is a perspective cross-sectional and exploded view of an assembly 200 consistent with FIG. 5. The magnetic mounting assembly 200 generally has a frame 210, a first ferromagnetic extension 220, a second ferromagnetic extension 230, and a bar magnet 240. The descriptions above of these components with respect to FIGS. 1-4 is incorporated in current description except where contradictory to the current description or figure.

In the current example, the magnetic mounting assembly 200 is a component of another device 300, such as an electronic or electromechanical device including such as a sensing device. In some other embodiments, the device is an electrical or electromechanical device, such as those described above with reference to FIGS. 1-4. The device 300 has a functional portion 310 that is configured to execute the function of the device 300, and a portion of the device 300 is the mounting assembly 200 that is configured to accommodate magnetic mounting of the device 300 to a structure. In the current example, a portion of the frame 210 also functions as a frame of the functional portion 310. More particularly, in the current example, a portion of the frame 210 forms a housing of the functional portion 310 of the device 300. In some implementations, the functional portion 310 of the device 300 includes circuitry 320 to enable functioning of the functional portion 310 of the device.

The circuitry 320 will generally have a circuit board 322, a microprocessor 324, and traces (not currently visible) along the circuit board 322 that are in communication with the microprocessor 324 that support power supply and data transmission. In one example implementation, the circuitry 320 can be characterized as sensing circuitry 320. The sensing circuitry 320 can include a vibration sensor 326 that is configured to sense the vibrations of the structure to which the mounting assembly 200 is magnetically mounted. The vibration sensor 326 is disposed on the circuit board 322. The vibration sensor 326 is in electrical and data communication with the microprocessor 324. The sensing device 300 can incorporate additional or alternative types of sensing devices, as well, such as a temperature sensor, optical sensor, magnetic field sensor, and the like.

Similar to embodiments discussed above, the frame 210 has a lateral end wall 212 (visible in FIG. 6). The frame 210 has a sidewall 214 extending axially from the lateral end wall 212. In the current example, the lateral end wall 212 and the sidewall 214 define a cavity 216, although in this example the cavity 216 has an axial depth that is less than the axial depth of the cavity in the example of FIGS. 1-4. Similar to the previous examples, the frame 210 is configured to be coupled to a component that is to be magnetically mounted to a structure via the mounting assembly 200. However, in current example, the frame 210 defines a housing 260 of the functional portion 310 that is to be magnetically mounted to a structure.

The bar magnet 240 is configured consistently with bar magnets discussed elsewhere herein. The bar magnet 240 is generally fixed relative to the frame 210. In the current example, the bar magnet 240 is disposed in the cavity 216 defined by the frame 210. The bar magnet 240 has a first magnetic pole 242 on a first lateral end and an opposite magnetic pole on a second, opposite lateral end.

The first ferromagnetic extension 220 is magnetically coupled to the first magnetic pole 242 of the bar magnet 240 and the second ferromagnetic extension 230 is magnetically coupled to the second magnetic pole 244 of the bar magnet 240. The first ferromagnetic extension 220 has a first distal end 221 that is magnetized via the first magnetic pole 242 of the bar magnet 240 and the second ferromagnetic extension 230 has a second distal end 231 that is magnetized via the second magnetic pole 244 of the bar magnet 240. The first distal end 221 and the second distal end 231 define a plane, as discussed above with reference to FIGS. 1-4. Also similar to examples described above, the first ferromagnetic extension 220 defines a first angled connection surface 224 extending axially inward and laterally inward from the first distal end 221 at an acute angle relative to the plane. The second ferromagnetic extension 230 defines a second angled connection surface 234 extending axially inward and laterally inward from the second distal end 231 at an acute angle relative to the plane.

The first ferromagnetic extension 220 and the second ferromagnetic extension 230 are configured to fix the bar magnet 240 relative to the frame 210. The first ferromagnetic extension 220 is fixed to the frame 210 and the second ferromagnetic extension 230 is fixed to the frame 210 via fasteners 250 (visible in FIG. 6), similar to the discussion above. The first ferromagnetic extension 220 defines a first retaining surface 222 and the second ferromagnetic extension 230 defines a second retaining surface 232 that each retain the position of the bar magnet 240 relative to the frame 210. The bar magnet 240 is fixed in the axial direction between (1) the first retaining surface 222 and the lateral end wall 212 and (2) between the second retaining surface 232 and the lateral end wall 212. The bar magnet 240 is also fixed in a first lateral direction between the first ferromagnetic extension 220 and the second ferromagnetic extension 230 which fixes the position of the bar magnet 240 in the first lateral direction. Furthermore, in the example shown, the bar magnet 240 is positioned in a second lateral direction, orthogonal to the first lateral direction, between opposing sidewall segments 214*a*, 214*b* of the sidewall 214 of the frame 210, which fixes the position of the bar magnet 240 in the second lateral direction.

Figure 7:
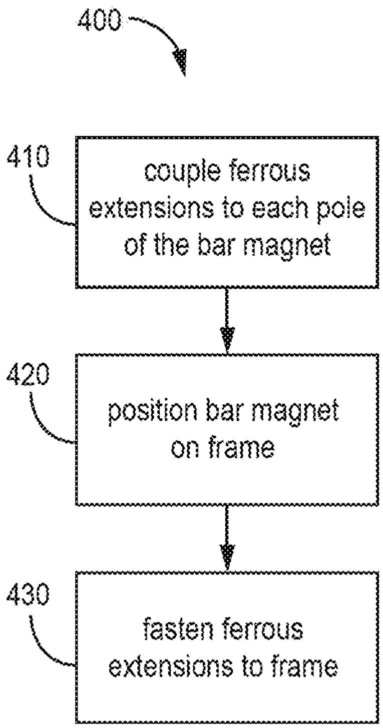
FIG. 7 is an example method consistent with the technology disclosed herein.

Some embodiments of the technology disclosed herein relate to a method of assembling a magnetic mounting assembly 400, an example flow chart of which is depicted in FIG. 7. Ferromagnetic extensions are coupled to each pole of the bar magnet 410, a bar magnet is positioned on a frame 420, and the ferromagnetic extensions are fastened to the frame 430. The magnetic mounting assembly and the components thereof are consistent with descriptions above, which are incorporated herein by reference unless contradictory to the current description.

The ferromagnetic extensions are generally coupled to each magnetic pole of the bar magnet 410 through magnetic forces. A first ferromagnetic extension is magnetically coupled to a first lateral end of the bar magnet, which is a first magnetic pole, and a second ferromagnetic extension is magnetically coupled to a second, opposite lateral end of the bar magnet, which is a second magnetic pole opposite the first magnetic pole. The first ferromagnetic extension and the second ferromagnetic extension each extend in the axial direction.

The bar magnet is positioned on the frame 420 such that a proximal surface of the bar magnet is facing the frame. The proximal surface of the bar magnet need not directly contact the frame, such as where a spacing material and/or adhesive is disposed between the proximal surface and the frame. In some embodiments the proximal surface does directly contact the frame such as where the assembly lacks adhesive between the bar magnet and the frame. In some embodiments where the frame has a lateral end wall and a sidewall extending axially from the lateral end wall to define a cavity, the bar magnet is disposed in the cavity.

The proximal surface of the bar magnet is generally a surface that does not define a magnetic pole of the bar magnet. In various embodiments, the proximal surface is perpendicular to the surfaces defining the magnetic poles of the bar magnet. The proximal surface can define a first axial end of the bar magnet. As discussed above, the bar magnet generally has a first lateral end defining a first magnetic pole and a second lateral end defining an opposite magnetic pole.

In various embodiments, coupling the ferromagnetic extensions to the magnetic poles of the bar magnet 410 generally occurs prior to positioning the bar magnet on the frame 420 such that the ferromagnetic extensions are simultaneously positioned on the frame with the bar magnet. Such a configuration may advantageously simplify the manufacturing process by simultaneously positioning three components (the first ferromagnetic extension, the second ferromagnetic extension, and the bar magnet) relative to the frame by virtue of the magnetic force holding the three components together into a sub-assembly. In embodiments where the frame defines a cavity, the sub-assembly can be dropped into the cavity relatively quickly and easily. In embodiments where the frame does not define a cavity, the sub-assembly can be positioned onto the frame relatively quickly and easily compared to processes where the first ferromagnetic extension, the second ferromagnetic extension, and the bar magnet are positioned individually onto the frame.

Similar to the bar magnet, in embodiments where the frame has a lateral end wall and a sidewall that defines a cavity, the first ferromagnetic extension and the second ferromagnetic extension can be disposed in the cavity. More particularly, in some embodiments a first proximal end of the first ferromagnetic extension can be disposed in the cavity while a first distal end of the first ferromagnetic extension can remain outside of the cavity. In such embodiments a second proximal end of the second ferromagnetic extension can be disposed in the cavity and the second distal end of the second ferromagnetic extension can remain outside of the cavity.

The ferromagnetic extensions are fastened to the frame 430 such that the first ferromagnetic extension is fastened to the frame and the second ferromagnetic extension is fastened to the frame. In various embodiments, fastening the first ferromagnetic extension to the frame and fastening the second ferromagnetic extension to the frame 430 results in fixing the bar magnet relative to the frame. As discussed above, each ferromagnetic extension can have a retaining surface that is configured to retain the bar magnet relative to the frame. Each retaining surface can face the lateral end wall of the frame. Each retaining surface can be configured to abut a distal end surface of the bar magnet that is opposite the proximal end surface of the bar magnet. The bar magnet can be retained between the lateral end wall of the frame and the retaining surfaces of the ferromagnetic extensions. Fastening the first ferromagnetic extension to the frame can include fastening a first fastener to the frame and the first ferromagnetic extension. Fastening the second ferromagnetic extension to the frame can include fastening a second fastener to the frame and the second ferromagnetic extension.

As discussed in detail above, in some embodiments, the frame defines a connector structure that is configured to be coupled to a sensing device. In some other embodiments, the frame is a component of a sensing device.

EXEMPLARY ASPECTS

Aspect 1. A magnetic mounting assembly comprising:
- a frame;
- a first ferromagnetic extension fixed to the frame, wherein the first ferromagnetic extension extends in an axial direction;
- a second ferromagnetic extension fixed to the frame, wherein the second ferromagnetic extension extends in the axial direction; and
- a bar magnet having a first lateral end defining a first magnetic pole magnetically coupled to the first ferromagnetic extension and a second lateral end defining an opposite magnetic pole magnetically coupled to the second ferromagnetic extension,
- wherein the first ferromagnetic extension and the second ferromagnetic extension are configured to fix the bar magnet relative to the frame.

Aspect 2. The magnetic mounting assembly of any one of Aspects 1 and 3-12, wherein the frame defines a connector structure that is configured to be coupled to a sensing device.

Aspect 3. The magnetic mounting assembly of any one of Aspects 1-2 and 4-12, wherein the frame is a component of a sensing device.

Aspect 4. The magnetic mounting assembly of any one of Aspects 1-3 and 5-12, wherein the assembly lacks adhesive between the bar magnet and the frame.

Aspect 5. The magnetic mounting assembly of any one of Aspects 1-4 and 6-12, wherein the frame is constructed of a non-magnetic material.

Aspect 6. The magnetic mounting assembly of any one of Aspects 1-5 and 7-12, wherein the frame is constructed of one or more materials in a group consisting of: aluminum, plastic, and zinc.

Aspect 7. The magnetic mounting assembly of any one of Aspects 1-6 and 8-12, the frame comprising a lateral end wall and a sidewall extending axially from the lateral end wall, wherein the lateral end wall and the sidewall define a cavity within which the bar magnet, the first ferromagnetic extension, and the second ferromagnetic extension are disposed.

Aspect 8. The magnetic mounting assembly of any one of Aspects 1-7 and 9-12, further comprising a first fastener that fixes the frame to the first ferromagnetic extension; and a second fastener that fixes the frame to the second ferromagnetic extension.

Aspect 9. The magnetic mounting assembly of any one of Aspects 1-8 and 10-12, wherein:
- the first ferromagnetic extension has a first proximal end disposed in the cavity and a first distal end outside of the cavity, and
- the second ferromagnetic extension has a second proximal end disposed in the cavity and a second distal end outside of the cavity, wherein the first distal end and the second distal end define a plane.

Aspect 10. The magnetic mounting assembly of any one of Aspects 1-9 and 11-12, wherein the first ferromagnetic extension and the second ferromagnetic extension each define a retaining surface that retains the position of the bar magnet relative to the frame.

Aspect 11. The magnetic mounting assembly of any one of Aspects 1-10 and 12, wherein the first ferromagnetic extension defines a first angled connection surface extending from the first distal end at an acute angle relative to the plane, and the second ferromagnetic extension defines a second angled connection surface extending from the second distal end at an acute angle relative to the plane.

Aspect 12. The magnetic mounting assembly of any one of Aspects 1-11, wherein the frame defines a lateral end wall, the first ferromagnetic extension has a first retaining surface facing the lateral end wall, the second ferromagnetic extension has a second retaining surface facing the lateral end wall, and the bar magnet is retained between the lateral end wall on a proximal end of the bar magnet and the first and second retaining surfaces on a distal end of the bar magnet.

Aspect 13. A method of assembling a magnetic mounting assembly comprising:

positioning a proximal end of a bar magnet on a frame, wherein the bar magnet has a first lateral end defining a first magnetic pole and a second lateral end defining an opposite magnetic pole;

magnetically coupling a first ferromagnetic extension to the first lateral end of the bar magnet, wherein the first ferromagnetic extension extends in an axial direction;

fastening the first ferromagnetic extension to the frame;

magnetically coupling a second ferromagnetic extension to the second lateral end of the bar magnet, wherein the second ferromagnetic extension extends in the axial direction; and fastening the second ferromagnetic extension to the frame, and wherein fastening the first ferromagnetic extension to the frame and fastening the second ferromagnetic extension to the frame results in fixing the bar magnet relative to the frame.

Aspect 14. The method of any one of Aspects 13 and 15-27, wherein the frame defines a connector structure that is configured to be coupled to a sensing device.

Aspect 15. The method of any one of Aspects 13-14 and 16-27, wherein the frame is a component of a sensing device.

Aspect 16. The method of any one of Aspects 13-15 and 17-27, wherein the assembly lacks adhesive between the bar magnet and the frame.

Aspect 17. The method of any one of Aspects 13-16 and 18-27, wherein the frame is constructed of a non-magnetic material.

Aspect 18. The method of any one of Aspects 13-17 and 19-27, wherein the frame is constructed of one or more materials in the group consisting of: aluminum, plastic, and zinc.

Aspect 19. The method of any one of Aspects 13-18 and 20-27, the frame comprising a lateral end wall and a sidewall extending axially from the lateral end wall, wherein the lateral end wall and the sidewall define a cavity, and the method further comprises disposing the bar magnet, the first ferromagnetic extension, and the second ferromagnetic extension in the cavity.

Aspect 20. The method of any one of Aspects 13-19 and 21-27, wherein fastening the first ferromagnetic extension to the frame comprises fastening a first fastener to the frame and the first ferromagnetic extension; and fastening the second ferromagnetic extension to the frame comprises fastening a second fastener to the frame and the second ferromagnetic extension.

Aspect 21. The method of any one of Aspects 13-20 and 22-27, wherein disposing the first ferromagnetic extension in the cavity comprises disposing a first proximal end of the first ferromagnetic extension in the cavity while a first distal end of the first ferromagnetic extension remains outside of the cavity; and disposing the second ferromagnetic extension in the cavity comprises disposing a second proximal end of the second ferromagnetic extension in the cavity while a second distal end of the second ferromagnetic extension remains outside of the cavity.

Aspect 22. The method of any one of Aspects 13-21 and 23-27, wherein the first distal end and the second distal end define a plane.

Aspect 23. The method of any one of Aspects 13-22 and 24-27, wherein the first ferromagnetic extension defines a first angled connection surface extending from the first distal end at an acute angle relative to the plane, and the second ferromagnetic extension defines a second angled connection surface extending from the second distal end at an acute angle relative to the plane.

Aspect 24. The method of any one of Aspects 13-23 and 25-27, wherein a first distal end of the first ferromagnetic extension and a second distal end of the second ferromagnetic extension each define a retaining surface that retains the position of the bar magnet relative to the frame.

Aspect 25. The method of any one of Aspects 13-24 and 26-27, wherein each retaining surface is configured to abut a distal end of the bar magnet that is opposite the proximal end of the bar magnet.

Aspect 26. The method of any one of Aspects 13-25 and 27, wherein the frame defines a lateral end wall, the first ferromagnetic extension has a first retaining surface facing the lateral end wall, the second ferromagnetic extension has a second retaining surface facing the lateral end wall, and the bar magnet is retained between the lateral end wall on the proximal end of the bar magnet and the first retaining surface and the second retaining surface on a distal end of the bar magnet Aspect 27. The method of any one of Aspects 13-26, wherein positioning the proximal end of the bar magnet on the frame occurs after (a) magnetically coupling the first ferromagnetic extension to the first lateral end of the bar magnet and (b) magnetically coupling the second ferromagnetic extension to the second lateral end of the bar magnet.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A magnetic mounting assembly comprising:

a frame;

a first ferromagnetic extension fixed to the frame, wherein the first ferromagnetic extension extends in an axial direction;

a second ferromagnetic extension fixed to the frame, wherein the second ferromagnetic extension extends in the axial direction; and a bar magnet having a first lateral end defining a first magnetic pole magnetically coupled to the first ferromagnetic extension and a second lateral end defining an opposite magnetic pole magnetically coupled to the second ferromagnetic extension, wherein the first ferromagnetic extension and the second ferromagnetic extension are configured to fix the bar magnet relative to the frame, and wherein the frame comprises a lateral end wall and a sidewall extending axially from the lateral end wall, wherein the lateral end wall and the sidewall define a cavity within which the bar magnet, the first ferromagnetic extension, and the second ferromagnetic extension are disposed.

2. The magnetic mounting assembly of claim 1, wherein the frame defines a connector structure that is configured to be coupled to a sensing device.

3. The magnetic mounting assembly of claim 1, wherein the frame is a component of a sensing device.

4. The magnetic mounting assembly of claim 1, wherein the assembly lacks adhesive between the bar magnet and the frame.

5. The magnetic mounting assembly of claim 1, wherein the frame is constructed of a non-magnetic material.

6. The magnetic mounting assembly of claim 5, wherein the frame is constructed of one or more materials in a group consisting of: aluminum, plastic, and zinc.

7. The magnetic mounting assembly of claim 5, further comprising a first fastener that fixes the frame to the first ferromagnetic extension; and a second fastener that fixes the frame to the second ferromagnetic extension.

8. The magnetic mounting assembly of claim 1, wherein:

the first ferromagnetic extension has a first proximal end disposed in the cavity and a first distal end outside of the cavity, and the second ferromagnetic extension has a second proximal end disposed in the cavity and a second distal end outside of the cavity, wherein the first distal end and the second distal end define a plane.

9. The magnetic mounting assembly of claim 8, wherein the first ferromagnetic extension and the second ferromagnetic extension each define a retaining surface that retains the position of the bar magnet relative to the frame.

10. The magnetic mounting assembly of claim 8, wherein the first ferromagnetic extension defines a first angled connection surface extending from the first distal end at an acute angle relative to the plane, and the second ferromagnetic extension defines a second angled connection surface extending from the second distal end at an acute angle relative to the plane.

11. The magnetic mounting assembly of claim 1, wherein the frame defines a lateral end wall, the first ferromagnetic extension has a first retaining surface facing the lateral end wall, the second ferromagnetic extension has a second retaining surface facing the lateral end wall, and the bar magnet is retained between the lateral end wall on a proximal end of the bar magnet and the first and second retaining surfaces on a distal end of the bar magnet.

12. A magnetic mounting assembly comprising:

a frame;

a first ferromagnetic extension fixed to the frame, wherein the first ferromagnetic extension extends in an axial direction;

a second ferromagnetic extension fixed to the frame, wherein the second ferromagnetic extension extends in the axial direction; and a bar magnet having a first lateral end defining a first magnetic pole magnetically coupled to the first ferromagnetic extension and a second lateral end defining an opposite magnetic pole magnetically coupled to the second ferromagnetic extension, wherein the first ferromagnetic extension and the second ferromagnetic extension are configured to fix the bar magnet relative to the frame, wherein the frame defines a lateral end wall, the first ferromagnetic extension has a first retaining surface facing the lateral end wall, the second ferromagnetic extension has a second retaining surface facing the lateral end wall, and the bar magnet is retained between the lateral end wall on a proximal end of the bar magnet and the first and second retaining surfaces on a distal end of the bar magnet.

* * * * *